United States Patent [19]
Yokota

[11] Patent Number: 4,610,516
[45] Date of Patent: Sep. 9, 1986

[54] PHOTOGRAPHIC LENS SYSTEM FOR ENDOSCOPES

[75] Inventor: Akira Yokota, Tokyo, Japan

[73] Assignee: Olympus Optical Co., Ltd., Tokyo, Japan

[21] Appl. No.: 617,731

[22] Filed: Jun. 6, 1984

[30] Foreign Application Priority Data

Jun. 9, 1983 [JP] Japan .................. 58-101615

[51] Int. Cl.[4] .............................. G02B 9/14
[52] U.S. Cl. ...................................... 350/475
[58] Field of Search ......................... 350/475

[56] References Cited
U.S. PATENT DOCUMENTS 3,443,863  5/1969  Ruben ................................. 350/475

Primary Examiner—John K. Corbin
Assistant Examiner—Rebecca D. Gass
Attorney, Agent, or Firm—Cushman, Darby & Cushman

[57] ABSTRACT

A photographic lens system for endoscope to be arranged on the rear of an eyepiece comprising three lens components including at least one negative lens component and having positive refractive power as a whole, said lens system being so adapted as to provide a flat image surface.

4 Claims, 12 Drawing Figures

PHOTOGRAPHIC LENS SYSTEM FOR ENDOSCOPES

BACKGROUND OF THE INVENTION (a) Field of the Invention

The present invention relates to a photographic lens system for endoscopes to be arranged on the rear of an eyepiece for photographing.

(b) Description of the Prior Art

In an optical system for endoscopes, for example, desinged to transfer an image by using a relay lens system composed of simple convex lens components, curvature of field is apt to be aggravated unlike that in an optical system for endoscopes designed to transfer an image by using an optical fiber bundle. In addition, curvature of field is further aggravated also by the positive cemented doublets having relatively simple compositions and used in the eyepiece arranged for observing the transferred image and a photographic lens system for endoscopes arranged on the rear of said eyepiece as shown in FIG. 1 (wherein the reference symbol E represents the eyepiece and the reference symbol AD designates the photographic lens system for endoscopes).

The negative curvature of field produced by the relay lens system can be cancelled by using an objective lens system having positive curvature of field. Though objective lens systems having the function to cancel the component of curvature of field produced by the relay lens system have already been known, an eyepiece having such a function has not been known yet. When an image is photographed with photographic lens system arranged as described above, curvature of field is aggravated by the eyepiece and photographic lens system, thereby making it impossible to photograph an image favorably.

SUMMARY OF THE INVENTION

A general object of the present invention is to provide a photographic lens system for endoscopes so adapted as to provide a flat image surface when used in combination with an eyepiece.

The photographic lens system for endoscopes according to the present invention has such a composition as shown in FIG. 2, and comprises three lens components including at least one negative lens component, for example, a positive lens component $L_1$, a negative lens component $L_2$ and a positive lens component $L_3$. The adaptor lens system according to the present invention is used in a position on the rear of an eyepiece E as shown in FIG. 2 wherein the reference symbol C represents a cover glass, the reference symbol P designates a prism and the reference symbol F denotes a film surface.

Further, the lens system according to the present invention is so designed as to satisfy the following conditions (1) and (2):

(1) $0.9 \leq |R_1R_2| \leq 1.2$
(2) $0.2 \leq |f_n/f| \leq 0.3$ wherein the reference symbols are defined as follows:

$R_1$: radius of curvature on the surface of the negative lens component $L_2$ located on the side of the lens component $L_1$ $R_2$: radius of curvature on the surface of the negative lens component $L_2$ located on the side of the lens component $L_3$ $f_n$: focal length of the negative lens component $L_2$ $f$: focal length of the photographic lens system as a whole.

Now, significance of the above-mentioned conditions will be described below:

Petzval's sum $PSt=0.829$, for example, is adequate for the entire lens system consisting of the eyepiece E and photographic lens system AD. When the eyepiece E has Petzval's sum $PSe=0.625$, the photographic lens system AD must have Petzval's sum $=0.227$.

Since Petzval's sum is defined as a product of focal lengths of the individual lens systems (in this case, the eyepiece, photographic lens system for endoscope, and entire lens system consisting of the eyepiece and photographic lens system for endoscope), the following relationship is obtained:

$$\frac{0.652}{f_e} + \frac{0.227}{f_a} = \frac{0.829}{f_t}$$

Since almost all of the current eyepieces have Petzval's sum $PSe=0.652$, this value may be considered as constant. Therefore, Petzval's sum of the photographic lens system for endoscopes can be determined uniquely when an adequate Petzval's sum is determined for the entire lens system. When $PSt=0.829$ is adopted as described above, PSa has a value of 0.227.

On the other hand, since Petzval's sum PS is defined as $\Sigma 1/nf$, focal length $f_n$ of the negative lens component is important for a lens system having such a composition as that of the lens system according to the present invention in order to minimize Petzval's sum to the level of $PSa=0.227$. Therefore, it is possible to minimize Petzval's sum of the photographic lens system for endoscopes by selecting an adequate value of power distribution $f_n/f$ between the negative lens component and the entire photographic lens system for endoscopes. Further, this means permits setting Petzval's sum at an adequate value for the entire lens system including the eyepiece. The condition (2) has been adopted by taking these points into consideration.

Moreover, since astigmatic difference on each lens surfaces and Petzval's sum PS are correlated to each other in Seidel's coefficients, PS have large values on the first and last surfaces (located on the side of the lens component $L_3$ in FIG. 2) of the above-mentioned negative lens component, and astigmatic differences also have large values. In order to minimize the astigmatic differences, it is therefore necessary to select an adequate value for bending of the negative lens component. For this reacon, radii of curvature of the first and last surfaces of the negative lens component have been difined within the range of the condition (1).

If $|R_1/R_2|$ exceeds the upper limit of the condition (1) adopted for the reason described above, astigmatic difference will be overcorrected. If $|R_1/R_2|$ is smaller than the lower limit of the condition (1), astigmatic difference will be undercorrected. If $|f_n/f|$ is smaller than the lower limit of the condition (2), curvature of field will be overcorrected. If $|f_n/f|$ exceeds the upper limit of the condition (2), in contrast, curvature of field will be undercorrected.

DETAILED DESCRIPTION OF THE PREFERRED EMBODIMENTS

Figure 1:
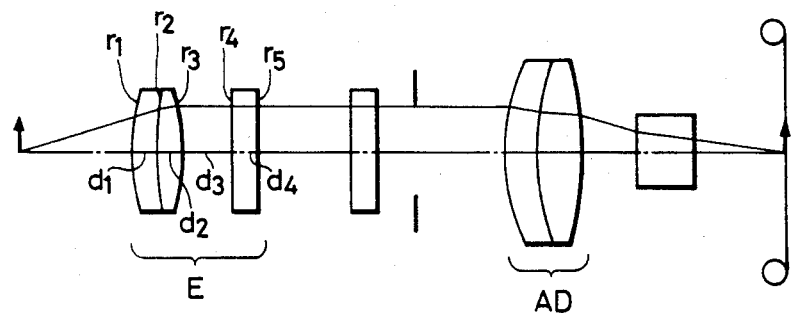
FIG. 1 shows a sectional view illustrating the compositions of the conventional eyepiece and photographic lens system for endoscopes.

Now, some preferred embodiments of the photographic lens system for endoscopes according to the present invention will be described below:

Embodiment 1
f = 49.393, NA = −0.0023
β = −0.051, PS = 0.227

| | | | |
|---|---|---|---|
| $r_1 = \infty$ | | | |
| | $d_1 = 1.00$ | $n_1 = 1.51633$ | $\nu_1 = 64.15$ |
| $r_2 = \infty$ | | | |
| | $d_2 = 7.8$ | | |
| $r_3 = 16.863$ | | | |
| | $d_3 = 2.5$ | $n_2 = 1.80610$ | $\nu_2 = 40.95$ |
| $r_4 = 150.104$ | | | |
| | $d_4 = 1.5351$ | | |
| $r_5 = -16.237$ | | | |
| | $d_5 = 1.5$ | $n_3 = 1.64769$ | $\nu_3 = 33.80$ |
| $r_6 = 16.237$ | | | |
| | $d_6 = 2.7702$ | | |
| $r_7 = -242.654$ | | | |
| | $d_7 = 3.0$ | $n_4 = 1.58913$ | $\nu_4 = 60.97$ |
| $r_8 = -11.942$ | | | |
| | $d_8 = 12.4047$ | | |
| $r_9 = \infty$ | | | |
| | $d_9 = 14.0$ | $n_5 = 1.51633$ | $\nu_5 = 64.15$ |
| $r_{10} = \infty$ | | | |

$$|R_1/R_2| = |r_5/r_6| = \left|\frac{-16.237}{16.237}\right| = 1$$

$$|f_n/f| = \left|\frac{-12.311}{49.393}\right| = 0.2492$$

Embodiment 2
f = 45.308, NA = −0.0023
β = −0.046, PS = 0.164

| | | | |
|---|---|---|---|
| $r_1 = \infty$ | | | |
| | $d_1 = 1.0$ | $n_1 = 1.51633$ | $\nu_1 = 64.15$ |
| $r_2 = \infty$ | | | |
| | $d_2 = 7.8$ | | |
| $r_3 = 22.5328$ | | | |
| | $d_3 = 2.5$ | $n_2 = 1.80610$ | $\nu_2 = 40.95$ |

-continued

Embodiment 2
f = 45.308, NA = −0.0023
β = −0.046, PS = 0.164

| | | | |
|---|---|---|---|
| $r_4 = 223.065$ | | | |
| | $d_4 = 1.5351$ | | |
| $r_5 = -14.3327$ | | | |
| | $d_5 = 0.7$ | $n_3 = 1.64769$ | $\nu_3 = 33.80$ |
| $r_6 = 50.1736$ | | | |
| | $d_6 = 0.8$ | $n_4 = 1.60729$ | $\nu_4 = 49.19$ |
| $r_7 = 13.7584$ | | | |
| | $d_7 = 2.7702$ | | |
| $r_8 = 39.213$ | | | |
| | $d_8 = 3.0$ | $n_5 = 1.58913$ | $\nu_5 = 60.97$ |
| $r_9 = -11.7492$ | | | |
| | $d_9 = 12.4047$ | | |
| $r_{10} = \infty$ | | | |
| | $d_{10} = 14.0$ | $n_6 = 1.51633$ | $\nu_6 = 64.15$ |
| $r_{11} = \infty$ | | | |

$$|R_1/R_2| = |r_5/r_7| = \left|\frac{-14.3327}{13.7584}\right| = 1.4017$$

$$|f_n/f| = \left|\frac{-10.869}{45.308}\right| = 0.2399$$

Embodiment 3
f = 48.283, NA = −0.0026
β = −0.050, PS = 0.222

| | | | |
|---|---|---|---|
| $r_1 = \infty$ | | | |
| | $d_1 = 1.00$ | $n_1 = 1.51633$ | $\nu_1 = 64.15$ |
| $r_2 = \infty$ | | | |
| | $d_2 = 4.4451$ | | |
| $r_3 = 17.8279$ | | | |
| | $d_3 = 2.5$ | $n_2 = 1.8061$ | $\nu_2 = 40.95$ |
| $r_4 = 152.9169$ | | | |
| | $d_4 = 2.5351$ | | |
| $r_5 = -16.0188$ | | | |
| | $d_5 = 1.5$ | $n_3 = 1.64769$ | $\nu_3 = 33.80$ |
| $r_6 = 16.2539$ | | | |
| | $d_6 = 2.7702$ | | |
| $r_7 = \infty$ | | | |
| | $d_7 = 3$ | $n_4 = 1.58913$ | $\nu_4 = 60.97$ |
| $r_8 = -11.8785$ | | | |
| | $d_8 = 12.4047$ | | |
| $r_9 = \infty$ | | | |
| | $d_9 = 14.0$ | $n_5 = 1.51633$ | $\nu_5 = 64.15$ |
| $r_{10} = \infty$ | | | |

$$|R_1/R_2| = |r_5/r_6| = \left|\frac{-16.0188}{16.2539}\right| = 0.9855$$

$$|f_n/f| = \left|\frac{-12.233}{48.283}\right| = 0.2534$$

wherein the reference symbols $r_1, r_2, \ldots$ represent radii of curvature on the surfaces of the respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $\nu_1, \nu_2, \ldots$ represent Abbe's number of the respective lens elements. The numerical data include those of the cover glass C and prism P. The symbol f denotes a focal length of the photographic lens system as a whole; NA represents a numerical aperture of the photographic lens system; β denotes a magnification of the photographic lens system; and PS represents Petzval's sum of the photographic lens system.

Figure 2:
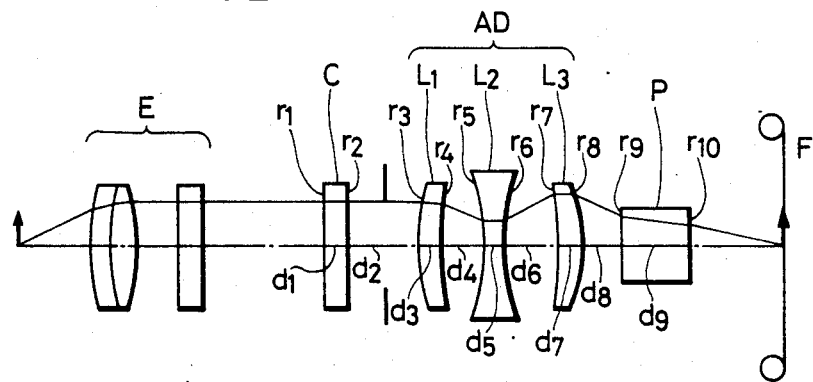
FIG. 2 through FIG. 4 show sectional views illustrating compositions of Embodiments 1 through 3 of the photographic lens system for endoscopes according to the present invention combined with eyepieces.
Figure 5:
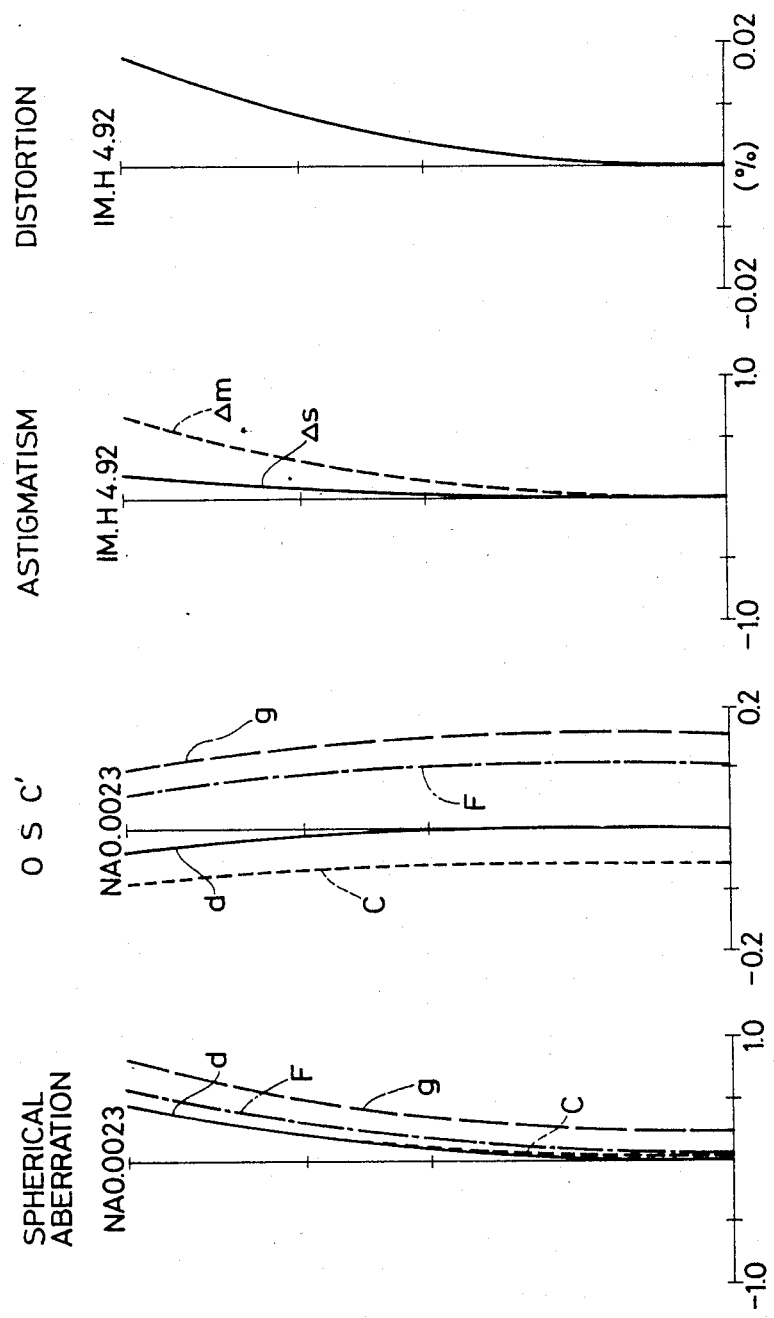
FIG. 5 shows curves illustrating aberration characteristics of the Embodiment 1.
Figure 6:
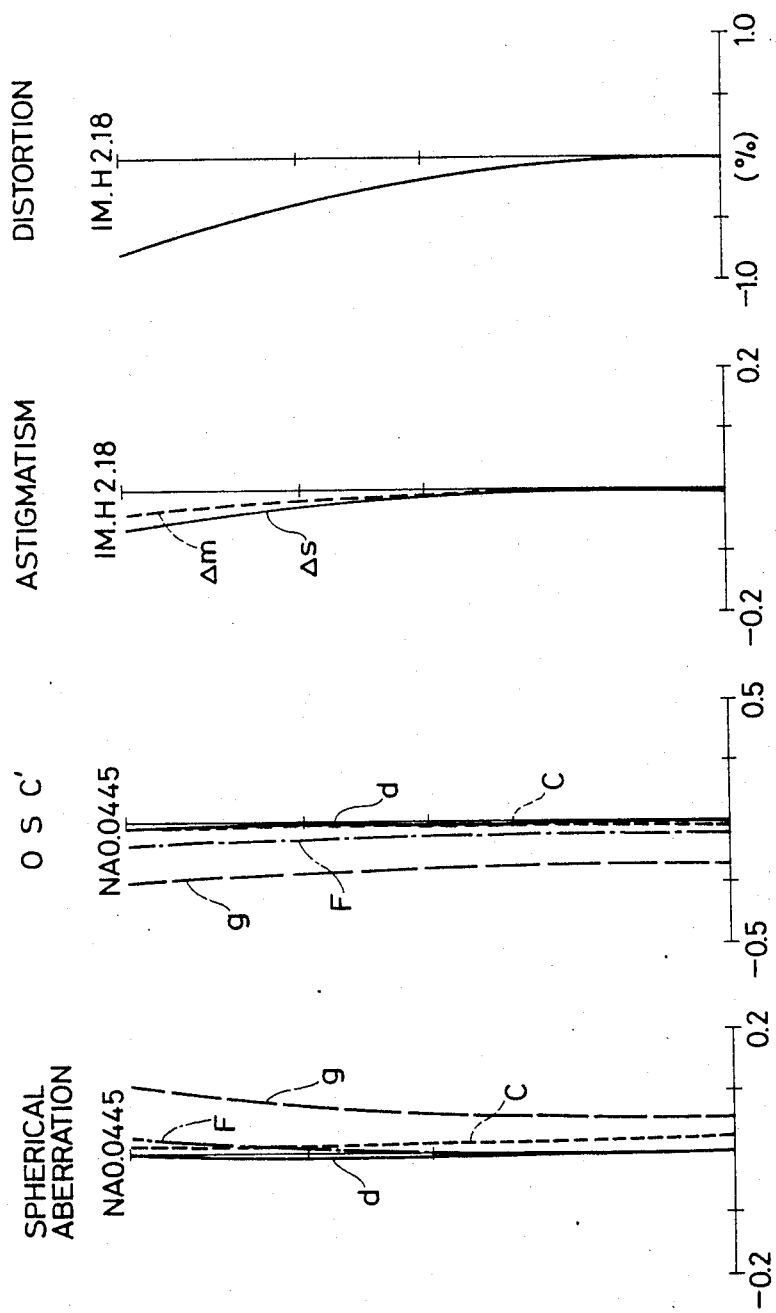
FIG. 6 shows curves illustrating aberration characteristics of the Embodiment 1 combined with an eyepiece.

Out of the embodiments described above, Embodiment 1 has the composition shown in FIG. 2. Aberration characteristics of the Embodiment 1 are illustrated in FIG. 5. FIG. 6 shows aberration characteristics of an optical system consisting of the Embodiment 1 and the eyepiece shown in FIG. 1 (eyepiece 1 having numerical data described later).

Figure 7:
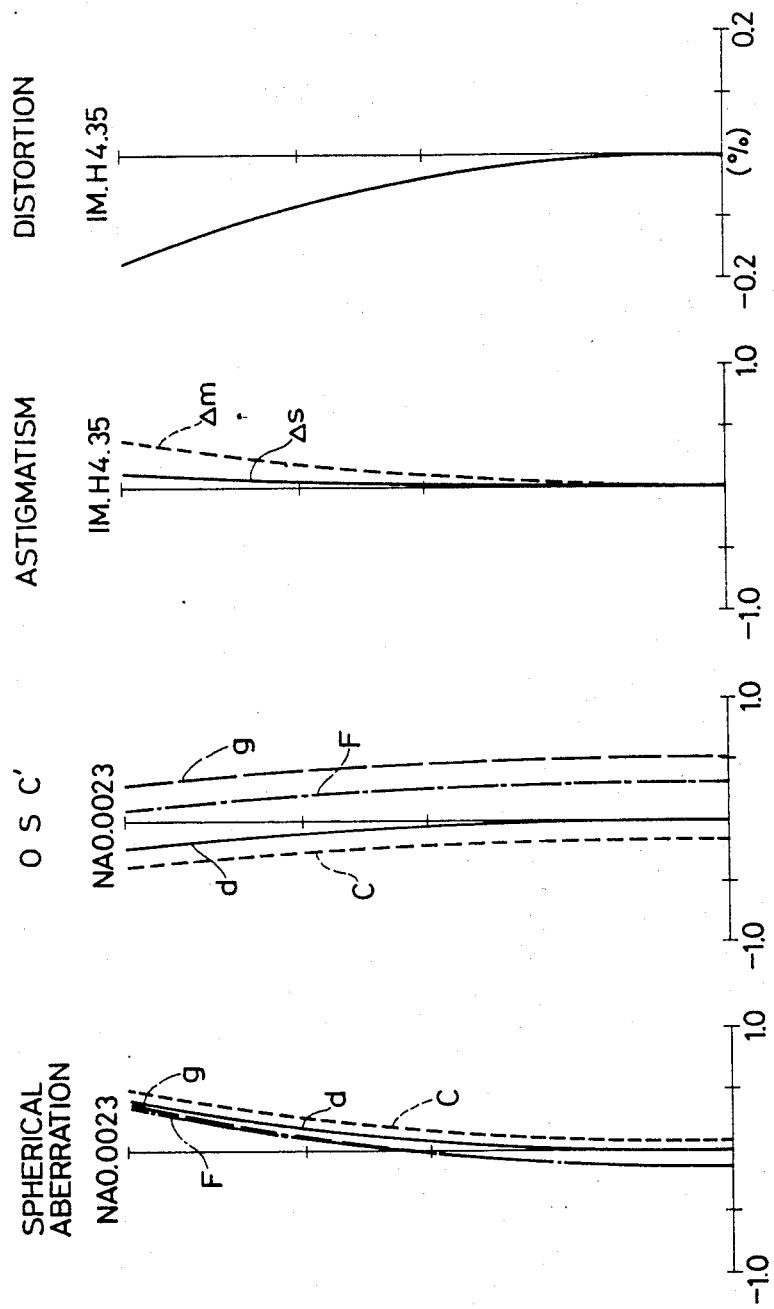
FIG. 7 shows curves illustrating aberration characteristics of the Embodiment 2.
Figure 10:
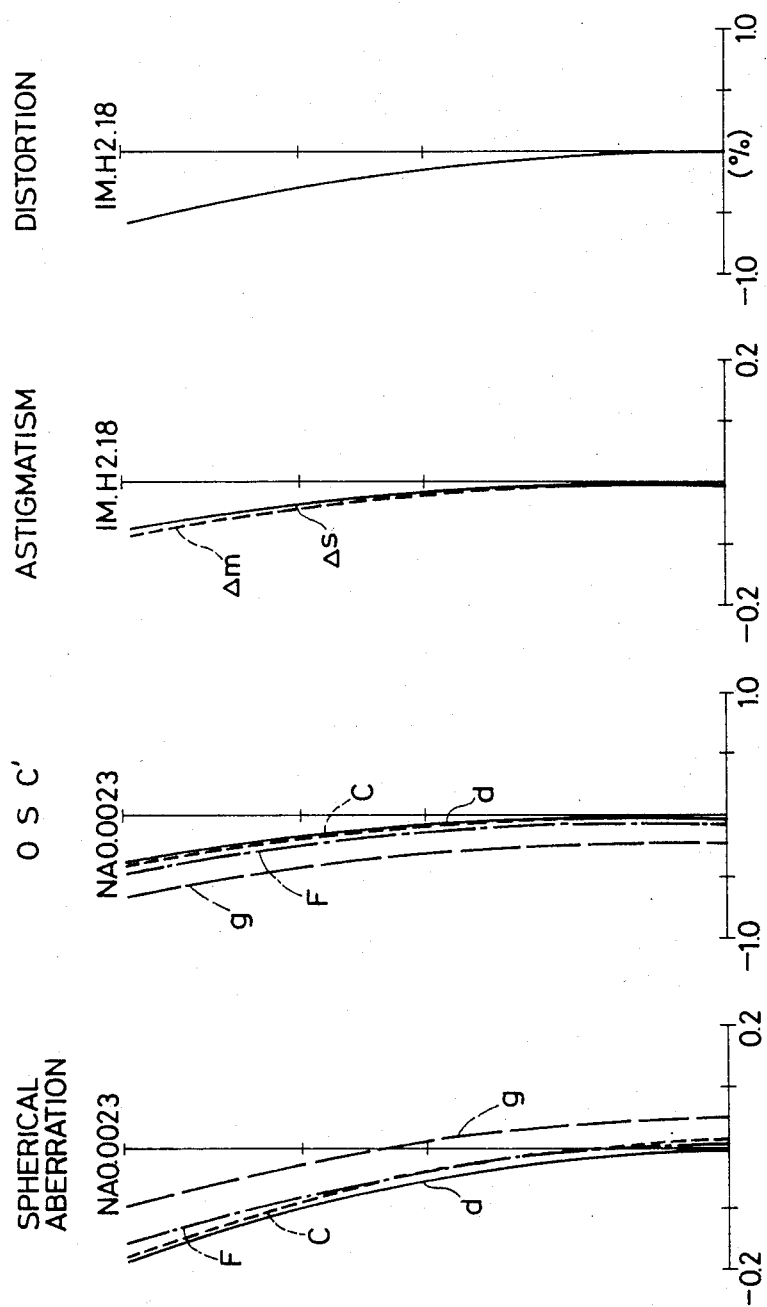
FIG. 10 shows curves illustrating aberration characteristics of an eyepiece 2.

The Embodiment 2 has the composition shown in FIG. 3 and combined with an eyepiece (eyepiece 2 having numerical data described later) which is different from that shown in FIG. 2. Aberration characteristics of the Embodiment 2 are illustrated in FIG. 7. Aberration characteristics of the eyepiece 2 are illustrated in FIG. 10.

Figure 4:
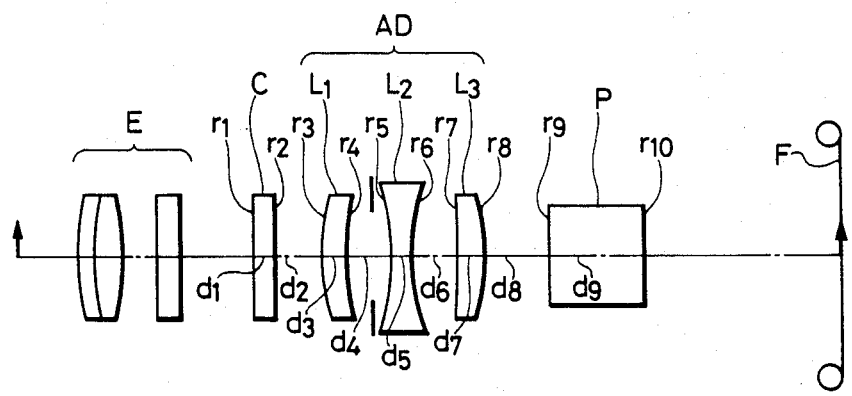
Figure 8:
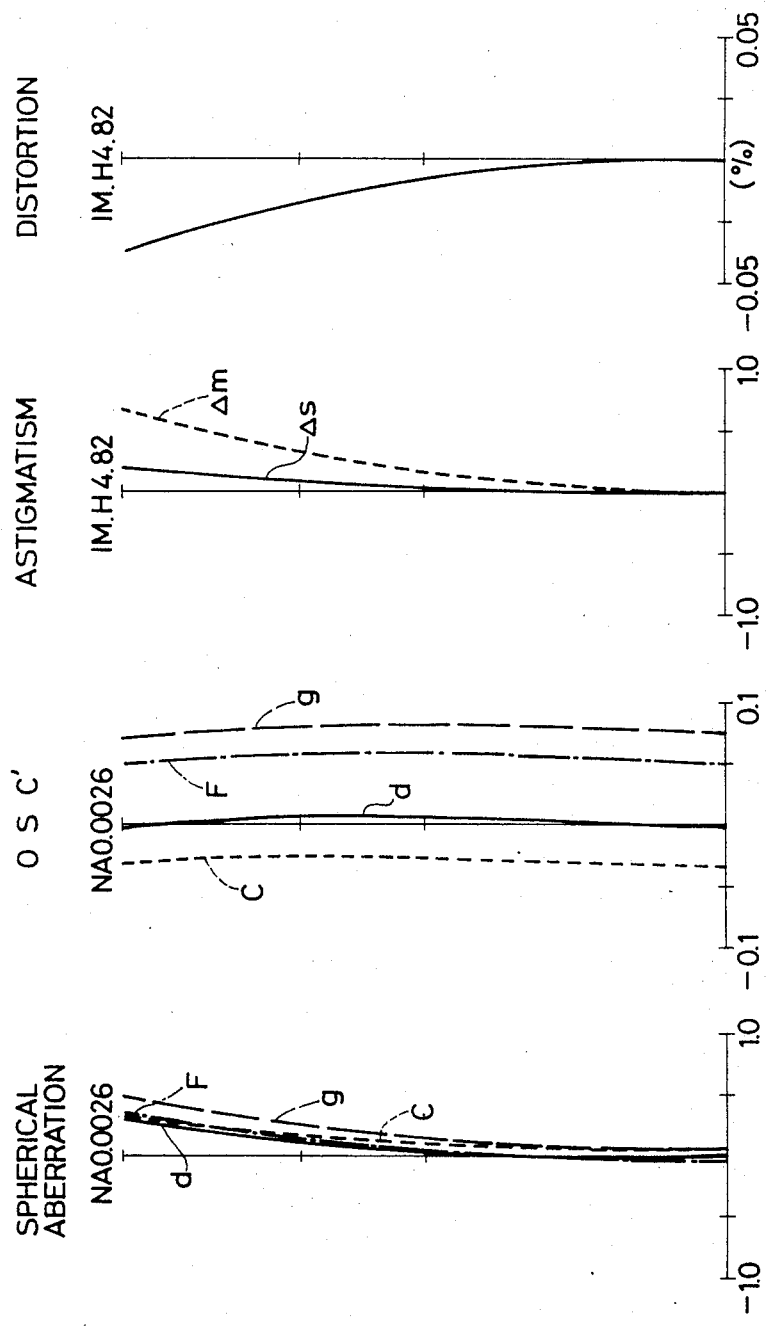
FIG. 8 shows curves illustrating aberration characteristics of the Embodiment 3.

The Embodiment 3 has the composition shown in FIG. 4 and combined with the same eyepiece as that used with the Embodiment 1. Aberration characteristics of this lens system are illustrated in FIG. 8.

As is understood from the foregoing descriptions and the above-mentioned embodiments, the photographic lens system according to the present invention can accomplish the object of the present invention. This point will be described below more detailedly with reference to the Embodiment 1. The eyepiece E only of the optical system including the Embodiment 1 of the present invention (the eyepiece 1 which is the same as the conventional eyepiece) has sagital astigmatism $DS = -0.104$ and meridional astigmatism $DM = -0.175$. In order to correct these DS and DM, Embodiment 1 has positive values of $DS = 0.037$ and $DM = 0.135$. As a result, the entire optical system consisting of the eyepiece E and photographic lens system for endoscope AD has $DS = -0.066$ and $DM = -0.043$.

In contrast, when the conventional photographic lens system AD comprising the convex doublet shown in FIG. 1 is used, the optical system consisting of the eyepiece and the photographic lens system has $DS = -0.161$ and $DM = -0.274$.

As is seen from these values, when the Embodiment 1 of the present invention is used, the optical system consisting of the eyepiece and the photographic lens system for endoscope as a whole forms sufficiently flat image plane. In addition, aberrations of the entire optical system are corrected more favorably than those of the eyepiece alone.

Figure 9:
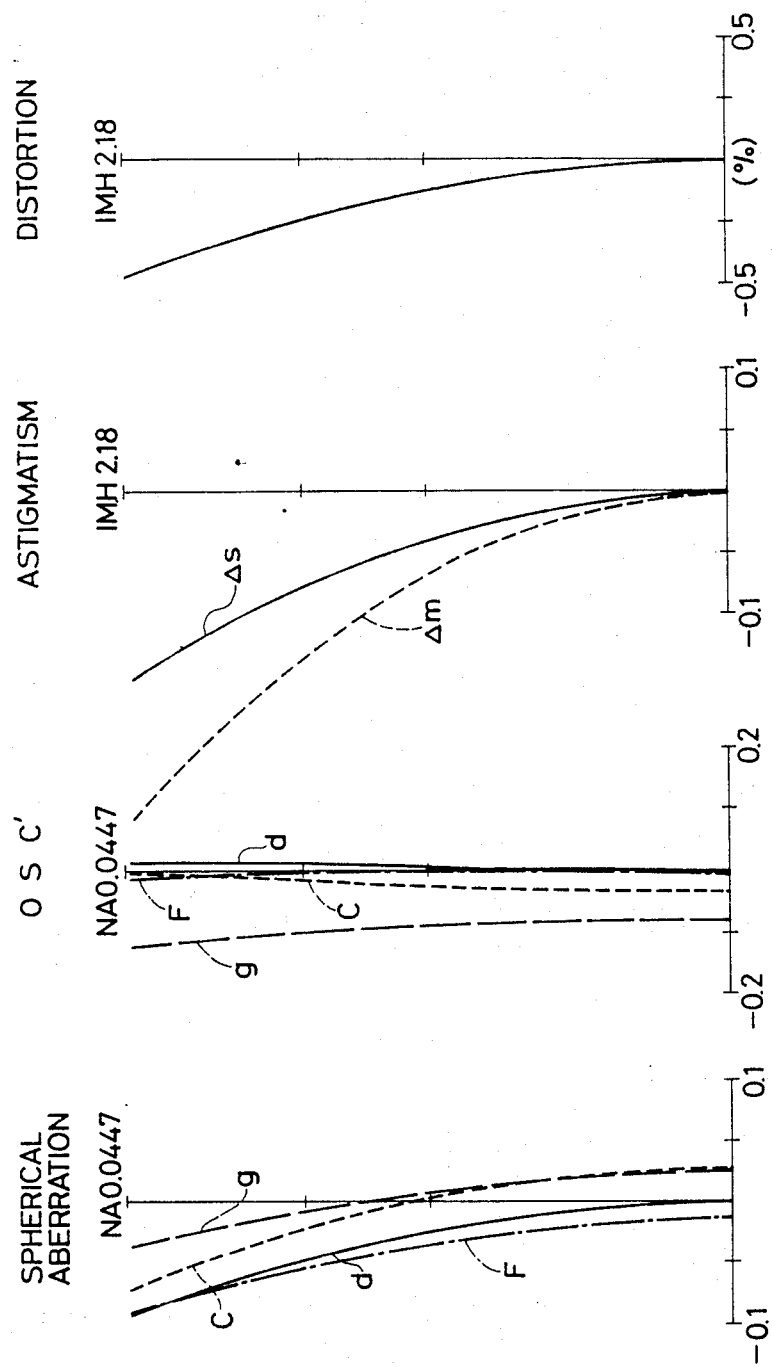
FIG. 9 shows curves illustrating aberration characteristics of an eyepiece 1 combined with the conventional photographic lens system for endoscopes.

These fact are clear also from the aberration curves. FIG. 9 shows aberration characteristics of the conventional optical system consisting of the eyepiece and the photographic lens system for endoscopes. When these curves are compared with the aberration curves of the optical system consisting of the Embodiment 1 and eyepiece 1 shown in FIG. 6, it is clear that aberrations are corrected more favorably in the latter.

Figure 11:
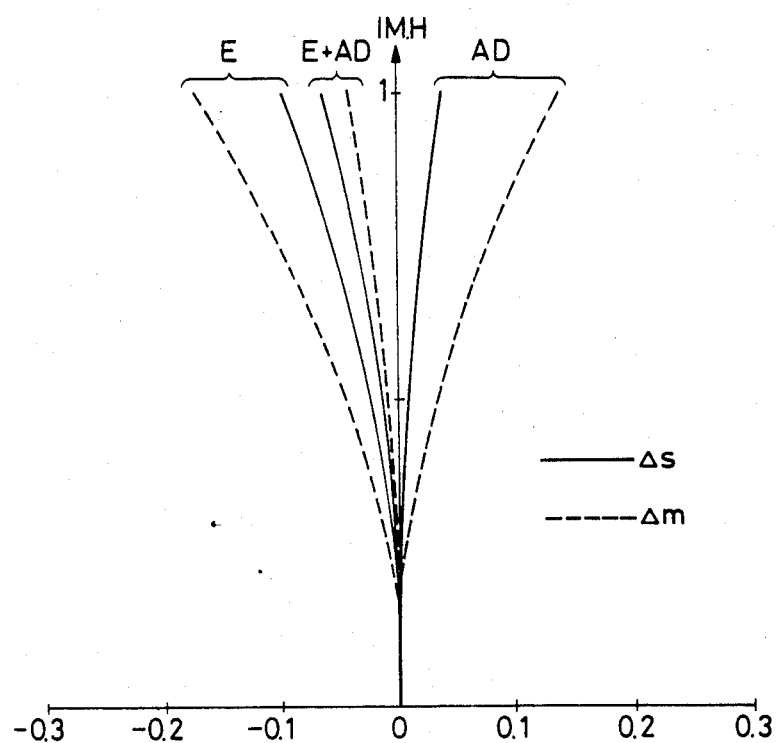
FIG. 11 shows curves illustrating astigmatism characteristics of the Embodiment 1, eyepiece 1, and a lens system as a combination of the Embodiment 1 and eyepiece 1 respectively.

FIG. 11 shows astigmatism characteristics of the eyepiece 1 only (represented by E in FIG. 11), photographic lens system only (designated by AD), and the optical system consisting of the eyepiece 1 and the photographic lens system (denoted by E+AD) of the Embodiment 1 of the present invention. It will be understood from these curves that the photographic lens system for endoscopes according to the present invention has a positive value, the eyepiece has a negative value, and the optical system as a combination thereof has a flat image plane.

Figure 12:
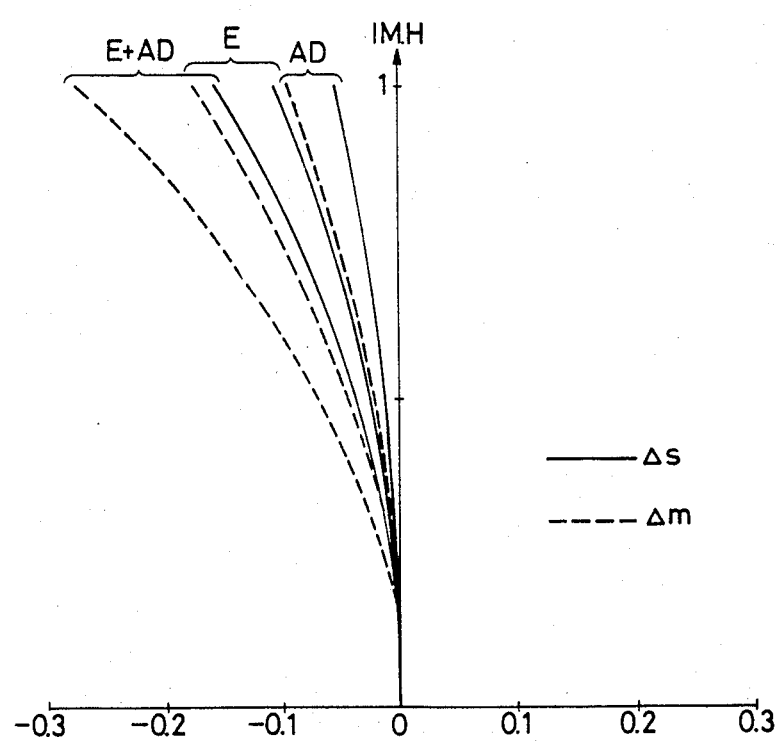
FIG. 12 shows curves illustrating astigmatism characteristics of the conventional photographic lens system for endoscopes, eyepiece 1 and a lens system as a combination of the conventional photographic lens system for endoscope and eyepiece 1 respectively.

In contrast, the conventional photographic lens system for endoscopes shown in FIG. 12 (represented by AD) has a negative value, thereby aggravating aberrations in the optical system composed by combining the eyepiece 1 and the photographic lens system for endoscopes (designated by E+AD).

Figure 3:
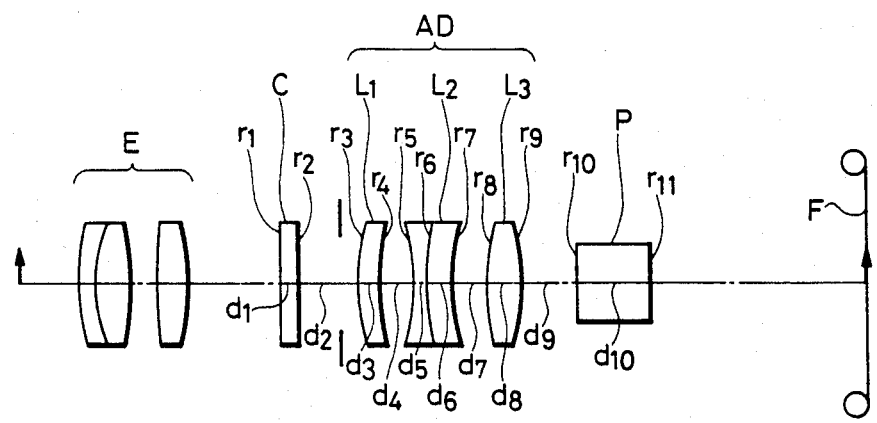

The eyepiece 1 shown in FIG. 1 (the conventional example), FIG. 2 (Embodiment 1) or FIG. 4 (Embodiment 3) and the eyepiece 2 shown in FIG. 3 (Embodiment 2) have the following numerical data sets respectively:

| Eyepiece 1 | | | |
|---|---|---|---|
| $f = 22.897$, | $NA = -0.0987$ | | |
| $\beta = 38.801$, | $PS = 0.652$ | | |
| $r_1 = 32.633$ | | | |
| | $d_1 = 0.87$ | $n_1 = 1.78472$ | $\nu_1 = 25.71$ |
| $r_2 = 11.000$ | | | |
| | $d_2 = 1.82$ | $n_2 = 1.66672$ | $\nu_2 = 48.32$ |
| $r_3 = -21.474$ | | | |
| | $d_3 = 2.00$ | | |
| $r_4 = \infty$ | | | |
| | $d_4 = 1.00$ | $n_3 = 1.51633$ | $\nu_3 = 64.15$ |
| $r_5 = \infty$ | | | |

| Eyepiece 2 | | | |
|---|---|---|---|
| $f = 23.385$, | $NA = -0.0445$ | | |
| $\beta = 63.79$, | $PS = 0.675$ | | |
| $r_1 = 41.5113$ | | | |
| | $d_1 = 0.87$ | $n_1 = 1.78472$ | $\nu_1 = 25.71$ |
| $r_2 = 14.7870$ | | | |
| | $d_2 = 1.82$ | $n_2 = 1.65160$ | $\nu_2 = 58.67$ |
| $r_3 = -27.1875$ | | | |
| | $d_3 = 2.00$ | | |
| $r_4 = 100.0$ | | | |
| | $d_4 = 1.00$ | $n_3 = 1.51633$ | $\nu_3 = 64.15$ |
| $r_5 = -100.0$ | | | |

I claim:

1. A photographic lens system for endoscopes comprising an eyepiece having a positive refracting power and an adapter lens to be arranged on the rear of said eyepiece for photographing, said adapter lens comprising a positive lens component, a negative lens component and a positive lens component and having positive refractive power as a whole, said photographic lens systems being so designed as to satisfy the following conditions (1) and (2):

(1) $0.9 \leq |R_1/R_2| \leq 1.2$
(2) $0.2 \leq |f_n/f| \leq 0.3$ wherein the reference symbols $R_1$ and $R_2$ represent radii of curvature on the first and last surfaces of said negative lens component, the reference symbol $f_n$ designates focal length of said negative lens component and the reference symbol $f$ denotes focal length of said photographic lens system as a whole.

2. A photographic lens system for endoscopes according to claim 1 comprising a positive lens component, a negative lens component and a positive lens component, and having the following numerical data:

| $f = 49.393$, | $NA = -0.0023$ | | |
|---|---|---|---|
| $\beta = -0.051$, | $PS = 0.227$ | | |
| $r_1 = \infty$ | | | |
| | $d_1 = 1.00$ | $n_1 = 1.51633$ | $\nu_1 = 64.15$ |
| $r_2 = \infty$ | | | |
| | $d_2 = 7.8$ | | |
| $r_3 = 16.863$ | | | |
| | $d_3 = 2.5$ | $n_2 = 1.80610$ | $\nu_2 = 40.95$ |
| $r_4 = 150.104$ | | | |
| | $d_4 = 1.5351$ | | |
| $r_5 = -16.237$ | | | |
| | $d_5 = 1.5$ | $n_3 = 1.64769$ | $\nu_3 = 33.80$ |
| $r_6 = 16.237$ | | | |
| | $d_6 = 2.7702$ | | |

-continued

| | f = 49.393, | NA = −0.0023 | |
|---|---|---|---|
| | β = −0.051, | PS = 0.227 | |
| $r_7 = -242.654$ | | | |
| | $d_7 = 3.0$ | $n_4 = 1.58913$ | $\nu_4 = 60.97$ |
| $r_8 = -11.942$ | | | |
| | $d_8 = 12.4047$ | | |
| $r_9 = \infty$ | | | |
| | $d_9 = 14.0$ | $n_5 = 1.51633$ | $\nu_5 = 64.15$ |
| $r_{10} = \infty$ | | | |

$$|R_1/R_2| = |r_5/r_6| = \left|\frac{-16.237}{16.237}\right| = 1$$

$$|fn/f| = \left|\frac{-12.311}{49.393}\right| = 0.2492$$

wherein the reference symbols $r_1$ through $r_{10}$ represent radii of curvature on the surfaces of the respective lens elements including the cover glass and prism, the reference symbols $d_1$ through $d_9$ designate thicknesses of the respective lens elements including the cover glass and prism, and airspaces reserved therebetween, the reference symbols $n_1$ through $n_5$ denote refractive indices of the respective lens elements including the cover glass and prism, the reference symbols $\nu_1$ through $\nu_5$ represent Abbe's numbers of the respective lens elements including the cover glass and prism the reference symbol f denotes a focal length of the photographic lens system as a whole; the reference symbol NA represents a numerical aperture of the photographic lens system; the reference symbol β denotes a magnification of the photographic lens system; and the reference symbol PS represents Petzval's sum of the photographic lens system.

3. A photographic lens system for endoscopes according to claim 1 comprising a positive lens component, a negative cemented doublet and a positive lens component, and having the following numerical data:

| | f = 45.308, | NA = −0.0023 | |
|---|---|---|---|
| | β = −0.046, | PS = 0.164 | |
| $r_1 = \infty$ | | | |
| | $d_1 = 1.0$ | $n_1 = 1.51633$ | $\nu_1 = 64.15$ |
| $r_2 = \infty$ | | | |
| | $d_2 = 7.8$ | | |
| $r_3 = 22.5328$ | | | |
| | $d_3 = 2.5$ | $n_2 = 1.80610$ | $\nu_2 = 40.95$ |
| $r_4 = 223.065$ | | | |
| | $d_4 = 1.5351$ | | |
| $r_5 = -14.3327$ | | | |
| | $d_5 = 0.7$ | $n_3 = 1.64769$ | $\nu_3 = 33.80$ |
| $r_6 = 50.1736$ | | | |
| | $d_6 = 0.8$ | $n_4 = 1.60729$ | $\nu_4 = 49.19$ |
| $r_7 = 13.7584$ | | | |
| | $d_7 = 2.7702$ | | |
| $r_8 = 39.213$ | | | |
| | $d_8 = 3.0$ | $n_5 = 1.58913$ | $\nu_5 = 60.97$ |
| $r_9 = -11.7492$ | | | |
| | $d_9 = 12.4047$ | | |
| $r_{10} = \infty$ | | | |
| | $d_{10} = 14.0$ | $n_6 = 1.51633$ | $\nu_6 = 64.15$ |
| $r_{11} = \infty$ | | | |

$$|R_1/R_2| = |r_5/r_7| = \left|\frac{-14.3327}{13.7584}\right| = 1.4017$$

$$|fn/f| = \left|\frac{-10.869}{45.308}\right| = 0.2399$$

wherein the reference symbols $r_1$ through $r_{11}$ represent radii of curvature on the surfaces of the respective lens elements including the cover glass and prism, the reference symbols $d_1$ through $d_{10}$ designate thicknesses of the respective lens elements including the cover glass and prism, and airspaces reserved therebetween, the reference symbols $n_1$ through $n_6$ denote refractive indices of the respective lens elements including the cover glass and prism, the reference symbols $\nu_1$ through $\nu_5$ represent Abbe's numbers of the respective lens elements including the cover glass and prism the reference symbol f denotes a focal length of the photographic lens system as a whole; the reference symbol NA represents a numerical aperture of the photographic lens system; the reference symbol β denotes a magnification of the photographic lens system; and the reference symbol PS represents Petzval's sum of the photographic lens system.

4. A photographic lens system for endoscopes according to claim 1 comprising a positive lens component, a negative lens component and a positive lens component, photographic lens system having the following numerical data:

| | f = 48.283, | NA = −0.0026 | |
|---|---|---|---|
| | β = −0.050, | PS = 0.222 | |
| $r_1 = \infty$ | | | |
| | $d_1 = 1.00$ | $n_1 = 1.51633$ | $\nu_1 = 64.15$ |
| $r_2 = \infty$ | | | |
| | $d_2 = 4.4451$ | | |
| $r_3 = 17.8279$ | | | |
| | $d_3 = 2.5$ | $n_2 = 1.8061$ | $\nu_2 = 40.95$ |
| $r_4 = 152.9169$ | | | |
| | $d_4 = 2.5351$ | | |
| $r_5 = -16.0188$ | | | |
| | $d_5 = 1.5$ | $n_3 = 1.64769$ | $\nu_3 = 33.80$ |
| $r_6 = 16.2539$ | | | |
| | $d_6 = 2.7702$ | | |
| $r_7 = \infty$ | | | |
| | $d_7 = 3$ | $n_4 = 1.58913$ | $\nu_4 = 60.97$ |
| $r_8 = -11.8785$ | | | |
| | $d_8 = 12.4047$ | | |
| $r_9 = \infty$ | | | |
| | $d_1 = 14.0$ | $n_5 = 1.51633$ | $\nu_5 = 64.15$ |
| $r_{10} = \infty$ | | | |

$$|R_1/R_2| = |r_5/r_6| = \left|\frac{-16.0188}{16.2539}\right| = 0.9855$$

$$|fn/f| = \left|\frac{-12.233}{48.283}\right| = 0.2534$$

wherein the reference symbols $r_1$ through $r_{10}$ represent radii of curvature on the surfaces of the respective lens elements including the cover glass and prism, the reference symbols $d_1$ through $d_9$ designate thicknesses of the respective lens elements including the cover glass and prism, and airspaces reserved therebetween, the reference symbols $n_1$ through $n_5$ denote refractive indices of the respective lens elements including the cover glass and prism, the reference symbols $\nu_1$ through $\nu_5$ represent Abbe's numbers of the respective lens elements including the cover glass and prism the reference symbol f denotes a focal length of the photographic lens system as a whole; the reference symbol NA represents a numerical aperture of the photographic lens system; the reference symbol β denotes a magnification of the photographic lens system; and the reference symbol PS represents Petzval's sum of the photographic lens system.

* * * * *